(12) United States Patent  
Takamoto et al.

(10) Patent No.: US 9,008,923 B2  
(45) Date of Patent: Apr. 14, 2015

(54) BICYCLE DERAILLEUR ADJUSTING APPARATUS

(71) Applicant: Shimano Inc., Sakai, Osaka (JP)

(72) Inventors: Ryuichiro Takamoto, Osaka (JP); Yoshiyuki Kasai, Osaka (JP)

(73) Assignee: Shimano Inc., Osaka (JP)

( * ) Notice: Subject to any disclaimer, the term of this patent is extended or adjusted under 35 U.S.C. 154(b) by 99 days.

(21) Appl. No.: 13/857,405

(22) Filed: Apr. 5, 2013

(65) Prior Publication Data
US 2014/0303857 A1    Oct. 9, 2014

(51) Int. Cl.
| | |
|---|---|
| *B62M 9/122* | (2010.01) |
| *B62M 9/123* | (2010.01) |
| *B62M 9/124* | (2010.01) |
| *B62M 9/132* | (2010.01) |
| *B62M 9/133* | (2010.01) |
| *B62M 9/134* | (2010.01) |
| *F16H 61/02* | (2006.01) |
| *B62M 25/00* | (2006.01) |
| *B62M 25/08* | (2006.01) |

(52) U.S. Cl.
CPC ........... *F16H 61/0202* (2013.01); *B62M 25/00* (2013.01); *B62M 25/08* (2013.01); *B62M 9/122* (2013.01); *B62M 9/132* (2013.01)

(58) Field of Classification Search
CPC .. B62M 25/00; B62M 25/08; B62M 2025/00; B62M 9/122; B62M 9/132; F16H 61/0202
USPC ....... 701/51, 52; 702/94, 105; 703/2; 474/70, 474/78, 80, 113, 116, 155
See application file for complete search history.

(56) References Cited

U.S. PATENT DOCUMENTS

| | | | | |
|---|---|---|---|---|
| 4,878,884 | A * | 11/1989 | Romano | 474/82 |
| 5,197,927 | A * | 3/1993 | Patterson et al. | 474/80 |
| 6,454,671 | B1 * | 9/2002 | Wickliffe | 474/80 |
| 6,945,888 | B2 * | 9/2005 | Fukuda et al. | 474/70 |
| 7,025,698 | B2 * | 4/2006 | Wickliffe | 474/80 |
| 7,306,531 | B2 * | 12/2007 | Ichida et al. | 474/70 |
| 7,547,263 | B2 | 6/2009 | Fukuda et al. | |
| 7,614,971 | B2 * | 11/2009 | Fujii et al. | 474/70 |
| 7,805,268 | B2 * | 9/2010 | Takamoto | 702/85 |
| 2005/0227798 | A1 * | 10/2005 | Ichida et al. | 474/81 |
| 2009/0210118 | A1 * | 8/2009 | Takamoto | 701/49 |
| 2012/0253601 | A1 * | 10/2012 | Ichida et al. | 701/37 |

\* cited by examiner

*Primary Examiner* — Russell Frejd  
(74) *Attorney, Agent, or Firm* — Global IP Counselors

(57) ABSTRACT

A bicycle derailleur adjusting apparatus for adjusting a bicycle derailleur includes a controller. The bicycle derailleur includes a base member adapted to be mounted to a bicycle, a movable member, a linkage coupled between the base member and the movable member, and an actuator configured to move the movable member of the bicycle derailleur among a plurality of derailleur positions. The controller is configured to control the actuator based on a travel value indicative of a travel distance of the movable member between adjacent derailleur positions to update the derailleur positions of the movable member.

18 Claims, 4 Drawing Sheets

| GEAR STATE | ANGULAR POSITION | TUNING PARAMETER | |
|---|---|---|---|
| FIRST END POSITION | X(0) | | A(0) |
| G(1) | X(1) | A(1) | |
| G(2) | X(2) | | A(2) |
| G(3) | X(3) | A(3) | |
| G(4) | X(4) | | A(4) |
| G(5) | X(5) | A(5) | |
| G(6) | X(6) | | A(6) |
| G(7) | X(7) | A(7) | |
| G(8) | X(8) | | A(8) |
| G(9) | X(9) | A(9) | |
| G(10) | X(10) | | A(10) |
| G(11) | X(11) | A(11) | |
| SECOND END POSITION | X(12) | | |

FIG. 4

BICYCLE DERAILLEUR ADJUSTING APPARATUS

BACKGROUND

1. Field of the Invention

This invention generally relates to a bicycle derailleur adjusting apparatus. More specifically, the present invention relates to a bicycle derailleur adjusting apparatus for adjusting a bicycle derailleur.

2. Background Information

Recently, electrical bicycle derailleurs have been used as a bicycle shifting device. One example of the electrical bicycle derailleurs is disclosed in U.S. Pat. No. 7,547,263 (Patent Citation 1). Specifically, this Patent Citation 1 discloses an electronic rear derailleur having a base member with a motor, a link mechanism pivotally connected to the base member, and a movable member pivotally mounted to the link mechanism.

The conventional electrical bicycle derailleur is generally operated in an automatic gear shift mode, a manual gear shift mode, and a calibration mode. During the automatic gear shift mode, the cadence is determined from the bicycle speed and the gear ratio, and the bicycle derailleur is automatically moved to a desired derailleur position such that the cadence falls within a preset range. During the manual gear shift mode, the bicycle derailleur is manually controlled using electrical switches for upshift and downshift such that the bicycle derailleur is moved to a desired derailleur position. The calibration mode is used to set up initial derailleur positions for sprockets. The calibration mode also is used to update the derailleur positions while actual derailleur positions deviate from the initial derailleur positions, respectively. In calibration mode, the derailleur positions are calibrated along a lateral direction of a bicycle by operating the electrical switches.

SUMMARY

With the conventional bicycle derailleur, the motor of the base member moves the link mechanism for calibrating the derailleur positions in the calibration mode in response to the operation of the electrical switches. Specifically, the link mechanism moves along the lateral direction of the bicycle in response to rotational output of a motor shaft of the motor. Furthermore, with the conventional bicycle derailleur, all of the derailleur positions are calibrated while one of the derailleur positions is calibrated. However, it has been discovered that the lateral movement of the link mechanism and the rotational output of the motor have non-linear relationship with respect to each other. Thus, it has also been discovered that with the conventional electrical bicycle derailleur, it is difficult to properly calibrate all of the derailleur positions if the calibrations of the derailleur positions are performed based on the rotational output of the motor due to the non-linearity.

One aspect is to provide a bicycle derailleur adjusting apparatus with which derailleur positions of a bicycle derailleur can be properly calibrated.

In accordance with a first aspect, a bicycle derailleur adjusting apparatus for adjusting a bicycle derailleur includes a controller. The bicycle derailleur includes a base member adapted to be mounted to a bicycle, a movable member, a linkage coupled between the base member and the movable member, and an actuator configured to move the movable member of the bicycle derailleur among a plurality of derailleur positions. The controller is configured to control the actuator based on a travel value indicative of a travel distance of the movable member between adjacent derailleur positions to update the derailleur positions of the movable member.

In accordance with a second aspect, with the bicycle derailleur adjusting apparatus according to the first aspect, the controller is configured to update the derailleur positions of the movable member by a tuning parameter calculated based on the travel value indicative of the travel distance of the movable member.

In accordance with a third aspect, with the bicycle derailleur adjusting apparatus according to the second aspect, the controller is configured to calculate the tuning parameter.

In accordance with a fourth aspect, the bicycle derailleur adjusting apparatus according to the second aspect further includes a storage device configured to store the derailleur positions of the movable member. The derailleur positions correspond to a plurality of sprockets, respectively.

In accordance with a fifth aspect, the bicycle derailleur adjusting apparatus according to the fourth aspect further includes an input member configured to input an adjustment input. The controller is configured to update one of the derailleur positions stored in the storage device based on the tuning parameter and the adjustment input inputted by the input member.

In accordance with a sixth aspect, with the bicycle derailleur adjusting apparatus according to the first aspect, the actuator has an output member that is rotatable and operatively coupled to the linkage, and the controller is configured to determine a rotational value of the output member.

In accordance with a seventh aspect, with the bicycle derailleur adjusting apparatus according to the first aspect, the travel distance of the movable member between the adjacent derailleur positions is measured in a lateral direction of the bicycle while the bicycle derailleur is mounted on a bicycle frame of the bicycle.

In accordance with an eighth aspect, with the bicycle derailleur adjusting apparatus according to the second aspect, the controller is further configured to calculate the tuning parameter by dividing the travel value indicative of the travel distance of the movable member by a predetermined number.

In accordance with a ninth aspect, with the bicycle derailleur adjusting apparatus according to the second aspect, the controller is further configured to calculate an updated one of the derailleur positions by multiplying the tuning parameter by a number of adjustment steps.

In accordance with a tenth aspect, the bicycle derailleur adjusting apparatus according to the ninth aspect further includes an input member configured to input an adjustment input that indicates the number of adjustment steps.

In accordance with an eleventh aspect, with the bicycle derailleur adjusting apparatus according to the ninth aspect, the controller is further configured to store the updated one of the derailleur positions in a storage device.

In accordance with a twelfth aspect, with the bicycle derailleur adjusting apparatus according to the eleventh aspect, the controller is further configured to store the number of the adjustment steps in the storage device.

In accordance with a thirteenth aspect, with the bicycle derailleur adjusting apparatus according to the first aspect, the controller is further configured to calculate a plurality of tuning parameters for a plurality of shift stages of the bicycle derailleur based on a plurality of travel values indicative of a plurality of travel distances of the movable member between a plurality of adjacent pairs of the derailleur positions, respectively. The controller is further configured to update the derailleur positions of the movable member based on the tuning parameters, respectively.

In accordance with a fourteenth aspect, with the bicycle derailleur adjusting apparatus according to the thirteenth aspect, the adjacent pairs of the derailleur positions define the shift stages of the bicycle derailleur therebetween, respectively.

In accordance with a fifteenth aspect, with the bicycle derailleur adjusting apparatus according to the thirteenth aspect, the controller is further configured to calculate the tuning parameters for the shift stages of the bicycle derailleur by dividing the travel values indicative of the travel distances of the movable member between the adjacent pairs of the derailleur positions by a predetermined number, respectively.

In accordance with a sixteenth aspect, with the bicycle derailleur adjusting apparatus according to the thirteenth aspect, the controller is further configured to update the derailleur positions by adjustment amounts that are calculated by multiplying the tuning parameters by a number of adjustment steps, respectively.

In accordance with a seventeenth aspect, with the bicycle derailleur adjusting apparatus according to the sixteenth aspect, the controller is further configured to store updated derailleur positions in a storage device.

In accordance with an eighteenth aspect, with the bicycle derailleur adjusting apparatus according to the seventeenth aspect, the controller is further configured to store the number of the adjustment steps in the storage device.

BRIEF DESCRIPTION OF THE DRAWINGS

Referring now to the attached drawings which form a part of this original disclosure;

FIG. 4 is a derailleur position table for the bicycle derailleur adjusting apparatus illustrated in FIG. 2.

DETAILED DESCRIPTION OF EMBODIMENTS

A preferred embodiment will now be explained with reference to the drawings. It will be apparent to those skilled in the art from this disclosure that the following descriptions of the embodiment are provided for illustration only and not for the purpose of limiting the invention as defined by the appended claims and their equivalents.

Figure 1:
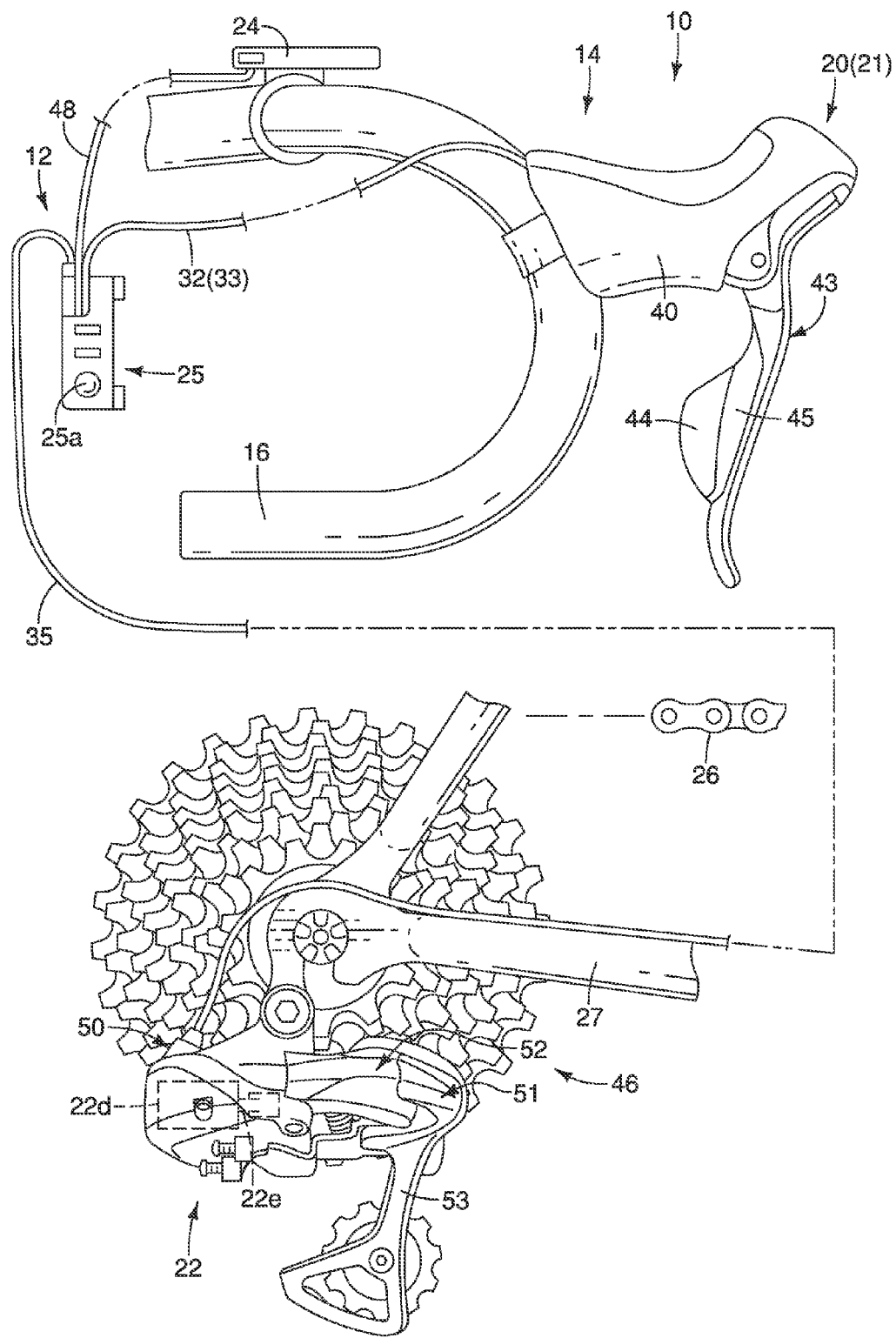
FIG. 1 is a partial side elevational view of a bicycle that is equipped with an electric bicycle shift system with a shift operating device and a bicycle derailleur in accordance with one embodiment.

Referring initially to FIG. 1, a bicycle 10 is illustrated that is equipped with a bicycle derailleur adjusting apparatus 12 in accordance with one embodiment. While the bicycle 10 is illustrated as a racing style road bike, the bicycle derailleur adjustment apparatus 12 is not limited to use with a road bike. In the illustrated embodiment, as seen in FIG. 1, the bicycle derailleur adjusting apparatus 12 is used in an electric bicycle shift system 14 that has both a manual shifting mode and an automatic shifting mode. These shifting modes are conventionally well known in the art. Thus, detailed descriptions of these shifting modes will be omitted for the sake of brevity. Furthermore, the bicycle shift system 14 is also operated in a calibration mode. This calibration mode will be described in detail below. In the illustrated embodiment, while the bicycle derailleur adjusting apparatus 12 is used in the electric bicycle shift system 14, it will be apparent to those skilled in the art from this disclosure that the bicycle derailleur adjusting apparatus 12 can be separately used from the electric bicycle shift system 14 with certain modifications.

Figure 2:
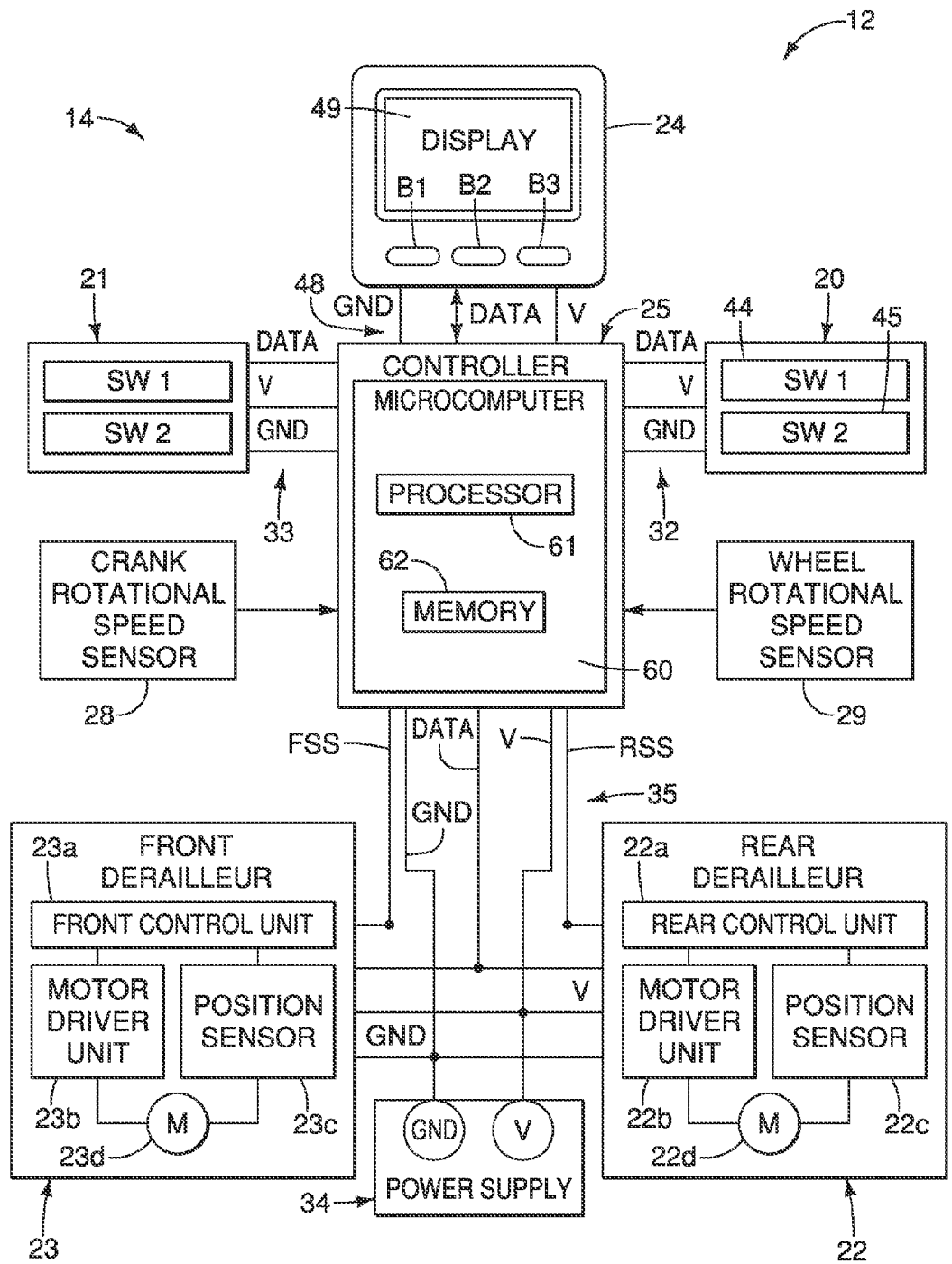
FIG. 2 is a simplified schematic block diagram showing an exemplary configuration of a bicycle derailleur adjusting apparatus for adjusting the bicycle derailleur illustrated in FIG. 1.

Referring to FIGS. 1 and 2, the electric bicycle shift system 14 basically includes a first shift operating device or shifter 20, a second shift operating device or shifter 21, a motorized rear derailleur 22, a motorized front derailleur 23, a cycling computer 24 and a controller 25. In the illustrated embodiment, the bicycle derailleur adjusting apparatus 12 for adjusting the rear and front derailleurs 22 and 23 (e.g., bicycle derailleurs) includes the controller 25. The controller 25 is provided with a mode button 25a for the rider or other users to select one of the manual shifting mode, the automatic shifting mode and the calibration mode. Alternatively, the operating mode of the electric bicycle shift system 14 can be selected in other ways such as by using the cycling computer 24 and/or operating buttons on one of the first and second shifters 20 and 21.

Basically, in order to shift gears in the manual shifting mode, the first and second shifters 20 and 21 are selected and operated by the rider to output control signals to operate the rear and front derailleurs 22 and 23 to move a chain 26 in a lateral direction of the bicycle 10 with respect to a bicycle frame 27. In the automatic shifting mode, the controller 25 controls the rear and front derailleurs 22 and 23 based on one or more control signals from one or more running condition sensors.

In the illustrated embodiment, as illustrated in FIG. 2, a crank rotational speed sensor 28 and a wheel rotational speed sensor 29 are provided for providing data to the controller 25 for automatically controlling the shifting of the rear and front derailleurs 22 and 23. For example, based on the detection signals from the crank rotational speed sensor 28 and the wheel rotational speed sensor 29, the controller 25 outputs control signals to shift the rear and front derailleurs 22 and 23 to attain a target gear ratio so that the cadence is maintained at approximately 60-70 RPM, which is a comfortable value for an ordinary person cruising on a bicycle. This type of automatic shifting as well as other types of automatic shifting can be performed by the controller 25. Since conventional automatic shifting can be used, the details of the automatic shifting mode will not be discussed in further detail herein.

In the illustrated embodiment, the first and second shifters 20 and 21 are brake and shift operating devices in which the first shifter 20 is fixedly mounted on the right-hand side of a handlebar 16 of the bicycle 10 and the second shifter 21 is fixedly mounted on the left-hand side of the handlebar 16. In particular, the first shifter 20 is operatively connected to the rear derailleur 22 and a rear brake (not shown), while the second shifter 21 is operatively connected to the front derailleur 23 and a front brake (not shown). In the illustrated embodiment, the first and second shifters 20 and 21 are mechanically connected to the rear and front brakes, respectively, using conventional Bowden-type brake cables. In the illustrated embodiment, the first and second shifters 20 and 21 are electrically connected to the controller 25 by first and second electrical cables 32 and 33. Alternatively, the front derailleur 23 and the front brake can be connected to the first shifter 20, and the rear derailleur 22 and the rear brake can be connected to the second shifter 21.

As illustrated in FIG. 2, the first and second electrical cables 32 and 33 output shift signals or commands to the controller 25 for controlling the rear and front derailleurs 22 and 23, respectively. The first and second shifters 20 and 21 also receive electrical power from a power supply or battery 34. In particular, an electrical harness 35 is provided between the controller 25 and the power supply 34 such that electrical power is supplied to the controller 25, which in turn supplies electrical power to the first and second shifters 20 and 21 via the first and second electrical cables 32 and 33, respectively. The electrical harness 35 transmits shift signals (FSS, RSS) and position signals for the rear and front derailleurs 22 and 23 (DATA) between the controller 25 and the rear and front derailleurs 22 and 23. The first and second electrical cables 32 and 33 and the electrical harness 35 may be replaced by a cable which includes only two conductor cables. In this case, PLC (Power Line communication) circuit boards may be included in the controller 25 and the rear and front derailleurs 22 and 23.

As illustrated in FIG. 1, the first shifter 20 is attached the curved portion of the handlebar 16, which is a drop-down handlebar in the illustrated embodiment. The second shifter 21 is a mirror image of the first shifter 20 and includes all of the features of the first shifter 20 discussed herein. Thus, the second shifter 21 will not be discussed in detail herein. Of course, it will be apparent from this disclosure that other types of electric shifters can be used as needed and/or desired instead of the type illustrated herein.

Basically, the first shifter 20 includes a base member 40 fixedly mounted on the right-hand side of the handlebar 16 in a conventional manner such as a band clamp as illustrated. A brake lever 43 is pivotally mounted to the base member 40 for operating the rear brake in a conventional manner. The brake lever 43 has a pair of pivotally mounted shift operating members 44 and 45. The shift operating members 44 and 45 are pushed toward a center plane of the bicycle 10 to depress electrical switches SW1 and SW2, respectively. A more detailed discussion of the shift operating members 44 and 45 and the electrical switches SW1 and SW2 can be found in U.S. Pat. No. 7,854,180 (assigned to Shimano Inc.). While the shift operating members 44 and 45 and the electrical switches SW1 and SW2 of the illustrated embodiment are constructed as shown in U.S. Pat. No. 7,854,180, the first and second shifters 20 and 21 are not limited to that particular construction. Here, operation of the shift operating member 44 normally causes the rear derailleur 22 to perform an upshift operation such that the chain 26 moves to a smaller one of rear sprockets 46, while operation of the shift operating member 45 normally causes the rear derailleur 22 to perform a downshift operation such that the chain 26 moves to a larger one of the rear sprockets 46. However, operation of the shift operating member 44 may cause the rear derailleur 22 to perform a downshift operation, while operation of the shift operating member 45 may cause the rear derailleur 22 to perform an upshift operation.

Referring to FIGS. 1 and 2, the basic construction of the rear derailleur 22 will now be discussed. The rear derailleur 22 is basically a conventional electric derailleur. As shown in FIG. 1, the rear derailleur 22 (e.g., the bicycle derailleur) includes a base member 50, a movable member 51, and a linkage 52. The base member 50 is adapted to be mounted to the bicycle 10. The linkage 52 is coupled between the base member 50 and the movable member 51. The rear derailleur 22 further has an electric configuration that includes a rear control unit 22a, a motor drive unit 22b, a position sensor 22c and a motor 22d (e.g., an actuator). The rear control unit 22a is configured and arranged to control the motor drive unit 22b in response to a shift control signal from operation of one of the electrical switches SW1 and SW2 of the first shifter 20. The motor 22d (e.g., the actuator) is configured to move the movable member 51 of the rear derailleur 22 (e.g., the bicycle derailleur) among a plurality of derailleur positions. Specifically, the motor 22d (e.g., the actuator) has an output member or shaft 22e that is rotatable and operatively coupled to the linkage 52. The output shaft 22e of the motor 22d is operatively connected to the movable member 51 via the linkage 52 for moving the movable member 51 relative to the base member 50, which also drives a pulley cage 53 of the rear derailleur 22 that is coupled to the movable member 51. The motor drive unit 22b is configured and arranged to drive the motor 22d. The position sensor 22c is configured and arranged to sense the derailleur position of the rear derailleur 22 by sensing an angular position of the output shaft 22e of the motor 22d. As shown in FIG. 2, the controller 25 and the rear derailleur 22 transmits signals therebetween. Thus, in the illustrated embodiment, the controller 25 is configured to determine the angular position (e.g., a rotational value) of the output shaft 22e (e.g., the output member) by obtaining the angular position of the output shaft 22e from the rear derailleur 22. One example of an electric rear derailleur having a position sensor is disclosed in U.S. Pat. No. 8,137,223 (assigned to Shimano Inc.). While a potentiometer can be used for the position sensor 22c such as disclosed in U.S. Pat. No. 8,137,223, the position sensor 22c is not limited to such a construction.

As shown in FIG. 1, the bicycle 10 has a plurality of (eleven in FIG. 1) rear sprockets 46 for selectively receiving a drive force from the chain 26. Operation of the motor 22d of the rear derailleur 22 moves the chain 26 between the rear sprockets 46 to change rear gear stages. While the bicycle 10 is illustrated with only eleven of the rear sprockets 46, the bicycle 10 can be provided with fewer or more rear sprockets 46.

Referring back to FIG. 2, the basic construction of the front derailleur 23 will now be discussed. The front derailleur 23 is basically a conventional electric derailleur that includes a front control unit 23a, a motor drive unit 23b, a position sensor 23c and a motor 23d. The front control unit 23a, the motor drive unit 23b and a position sensor 23c form the front actuating unit. The front control unit 23a is configured and arranged to control the motor drive unit 23b in response to a shift control signal from operation of one of the electrical switches SW1 and SW2 of the second shifter 21. The motor 23d is configured and arranged to drive a chain cage of the front derailleur 23. The motor drive unit 23b is configured and arranged to drive the motor 23d. The position sensor 23c is configured and arranged to sense derailleur position of the front derailleur 23. One example of an electric front derailleur having a position sensor (i.e., a transmission state determining component) is disclosed in U.S. Pat. No. 7,306,531 (assigned to Shimano Inc.). While a potentiometer can be used for the position sensor 23c such as disclosed in U.S. Pat. No. 7,306,531, the position sensor 23c is not limited to such a construction.

The bicycle 10 has a pair of front chainwheels (not shown) for transmitting a pedaling force to the chain 26. Operation of the motor 23d of the front derailleur 23 moves the chain 26 between the front chainwheels to change front gear stages. While the bicycle 10 is illustrated with only two of the front chainwheels, the bicycle 10 can be provided with more than two chainwheels.

The cycling computer 24 includes a microprocessor, memory and other conventional structures of a conventional cycling computer. Since cycling computers are conventional devices that are well known, the cycling computer 24 will not be discussed and/or illustrated herein, except as modified to accommodate the bicycle derailleur adjusting apparatus 12. In particular, the cycling computer 24 is electrically connected to the controller 25 by a cable 48 to receive various data from other components of the electric bicycle shift system 14. The cable 48 can also optionally supply power to the cycling computer 24 as illustrated in FIG. 2. Alternatively, the cycling computer 24 can have its own power supply (e.g., a replaceable battery).

The cycling computer 24 can be a part of the bicycle derailleur adjusting apparatus 12. However, the various functions of the cycling computer 24 can be integrated into one or both of the first and second shifters 20 and 21 and/or the controller 25. Thus, the bicycle derailleur adjusting apparatus 12 is no limited to being used with a cycling computer such as the cycling computer 24 as discussed herein.

The cycling computer 24 has a display 49 for displaying gear positions or stages, speed, traveled distance and other information to the rider as in the case of most cycling computers. In the illustrated embodiment, the cycling computer 24 is a conventional cycling computer with a plurality of user inputs or control buttons B1, B2 and B3. Thus, the detailed description will be omitted for the sake of brevity. In the illustrated embodiment, while the control buttons B1, B2 and B3 are illustrated as mechanical buttons, the display 49 could be a touch screen with the control buttons being provided on the touch screen.

Referring to FIG. 2, in the illustrated embodiment, the controller 25 is electrically connected to various parts of the electric bicycle shift system 14. The controller 25 interprets and executes instructions (data, signals and commands) of the various programs and hardware to direct the operation of the electric bicycle shift system 14. The controller 25 includes a microcomputer 60 with a processor 61 and a memory 62 (e.g., a storage device) for processing the various signals from the various sensors and components of the electric bicycle shift system 14. In the illustrated embodiment, the memory 62 includes a non-volatile memory, a volatile memory, or a combination thereof. However, the memory 62 can include different configuration as needed and/or desired. While the controller 25 is illustrated as a single separate unit, the controller 25 could be part of another component or could be a part of several components (e.g., multiple controllers located in different parts). Furthermore, while the memory 62 is illustrated as a single separate unit, the memory 62 could be part of another component or could be a part of several components (e.g., multiple memories located in different parts). Furthermore, the memory 62 can be separately or remotely formed from the controller 25 as an independent unit. In the illustrated embodiment, the mode button 25a of the controller 25 is used for selecting one of the manual shifting mode, the automatic shifting mode and the calibration mode.

During the manual shifting mode, the gear shifting operation is manually performed by manually operating the electrical switches SW1 and SW2 of the first and second shifters 20 and 21 for upshift and downshift operations, respectively. During the automatic shifting mode, the cadence is determined from the bicycle speed and the gear ratio, and the gear shifting operation is automatically performed such that the cadence falls within a preset range. In these shifting modes, the controller 25 moves the rear and front derailleurs 22 and 23 to selected derailleur positions, respectively. Specifically, the derailleur positions of the rear and front derailleurs 22 and 23 are stored in the memory 62 of the controller 25 by directly or indirectly storing the derailleur positions in the memory 62. In the illustrated embodiment, the derailleur positions of the rear derailleur 22 are stored in the memory 62 as angular positions of the output shaft 22e of the motor 22d, respectively, while the derailleur positions of the front derailleur 23 are stored in the memory 62 as angular positions of an output member or shaft (not shown) of the motor 23d, respectively.

The derailleur positions of the rear derailleur 22 are associated with the rear sprockets 46, respectively, while the derailleur positions of the front derailleur 23 are associated with the front chainwheels, respectively. Thus, during these shifting modes, the controller 25 moves the rear derailleur 22 to a selected derailleur position corresponding to a selected one of the rear sprockets 46, while the controller 25 moves the front derailleur 23 to a selected derailleur position corresponding to a selected one of the front chainwheels. In particular, in the illustrated embodiment, during these shifting modes, the controller 25 controls the angular position of the motor 22d such that the rear derailleur 22 is adjusted to the selected derailleur position corresponding to the selected one of the rear sprockets 46, while the controller 25 controls the angular position of the motor 23d such that the front derailleur 23 is adjusted to the selected derailleur position corresponding to the selected one of the front chainwheels, respectively. It will be apparent to those skilled in the art from this disclosure that the derailleur positions of the rear derailleur 22 can be stored in the memory 62 as different values, such as lateral positions (e.g., derailleur positions) of the movable member 51, the pulley cage 53, a guide pulley or other part of the rear derailleur 22, angular positions of a linkage of the rear derailleur 22, and the like. In other words, the bicycle derailleur adjusting apparatus 12 can include the memory 62 (e.g., the storage device) configured to store the derailleur positions of the movable member 51 that correspond to the rear sprockets 46, respectively. Furthermore, it will be apparent to those skilled in the art from this disclosure that the derailleur positions of the front derailleur 23 can be stored in the memory 62 as different values, such as lateral positions of a chain guide or other part of the front derailleur 23, angular positions of a linkage of the front derailleur 23, and the like.

On the other hand, the calibration mode is used to set up initial derailleur positions with respect to the rear sprockets 46 and the front chainwheels in production process. The calibration mode also is used to update derailleur positions while actual derailleur positions deviate with respect to the rear sprockets 46 and the front chainwheels, respectively. The calibration mode is performed by manually operating the electrical switches SW1 and SW2 of the first and second shifters 20 and 21 for laterally moving the rear and front derailleurs 22 and 23 with respect to the rear sprockets 46 and the front chainwheels, respectively.

Figure 3:
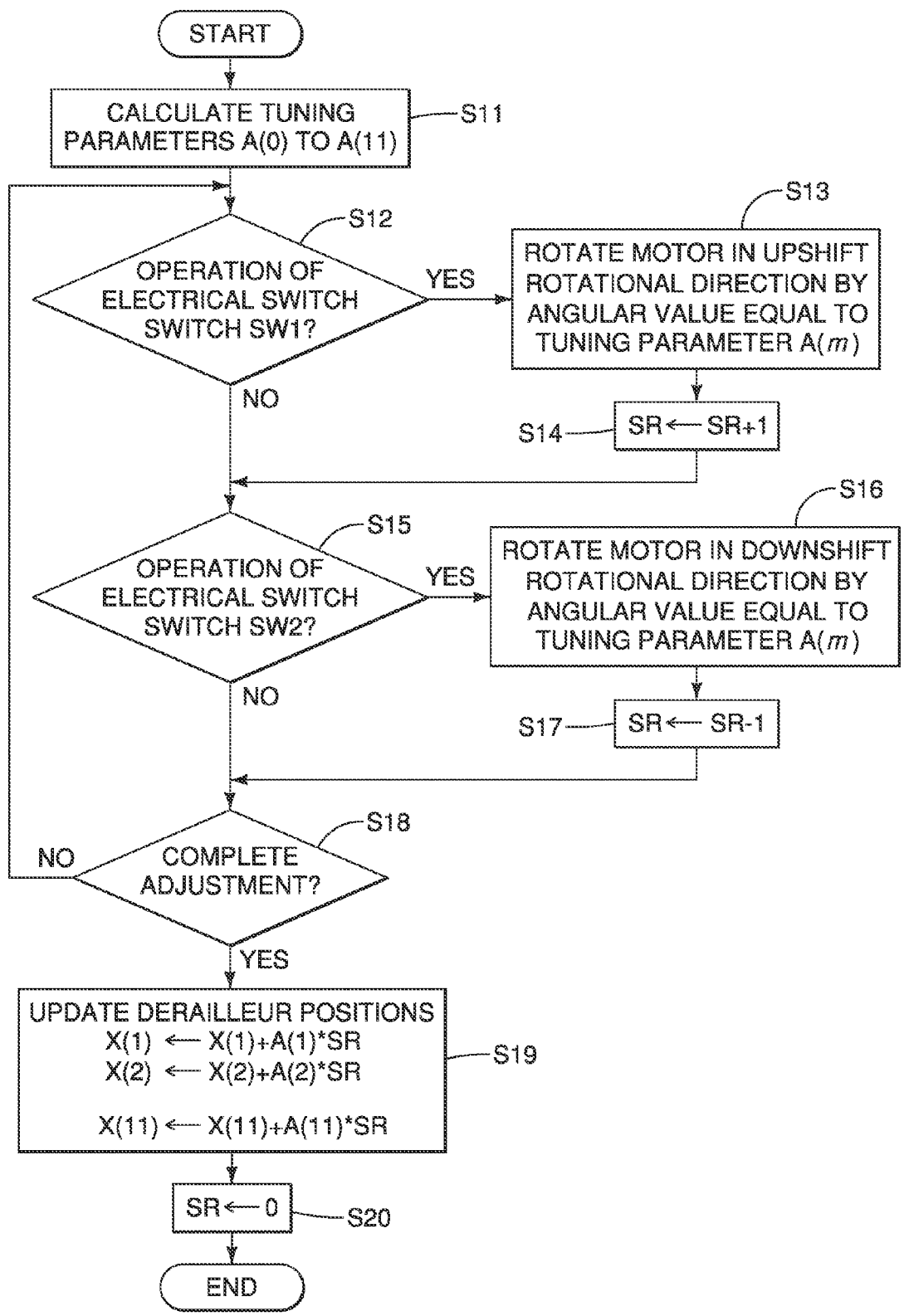
FIG. 3 is a flowchart showing a calibration process of the bicycle derailleur adjusting apparatus illustrated in FIG. 2.

Referring to FIG. 3, the calibration mode of the electric bicycle shift system 14 will be further described in detail. In the illustrated embodiment, calibration process of the derailleur positions of the rear derailleur 22 will only be discussed in detail. However, it will be apparent to those skilled in the art from this disclosure that calibration process of the derailleur positions of the front derailleur 23 can also be performed in the manner similar to the calibration process of the derailleur positions of the rear derailleur 22 with certain modifications.

FIG. 3 is a flow chart of the calibration process of the derailleur positions of the rear derailleur 22. The calibration process is commenced in response to selecting the calibration mode of the electric bicycle shift system 14 by operating the mode button 25a of the controller 25. Alternatively or additionally, this calibration process can be commenced every time the controller 25 is booted. In the illustrated embodiment, during this calibration process of the derailleur positions of the rear derailleur 22, all of the derailleur positions of the rear derailleur 22 can be calibrated. However, it will be apparent to those skilled in the art from this disclosure that selected ones of or only one of the derailleur positions of the rear derailleur 22 can be calibrated during this calibration process with certain modifications.

Before the calibration process is commenced, the controller 25 moves the rear derailleur 22 to a selected one of the derailleur positions in response to operational input of the electrical switches SW1 and SW2 of the first shifter 20. The controller 25 moves the rear derailleur 22 to the selected one of the derailleur positions corresponding to the selected one of the rear sprockets 46 in the same manner as in the manual shifting mode. As shown in FIG. 4, in the illustrated embodiment, the derailleur positions of the rear derailleur 22 are stored in the memory 62 by storing angular positions X(1) to X(11) of the output shaft 22e of the motor 22d corresponding to the derailleur positions of the rear derailleur 22, respectively. Since the derailleur positions of the rear derailleur 22 correspond to gear stages G(1) to G(11) of the eleven rear sprockets 46, respectively, the angular positions X(1) to X(11) also correspond to gear stages G(1) to G(11) of the eleven rear sprockets 46, respectively. Additionally or optionally, the memory 62 also stores first and second end positions of the rear derailleur 22 by storing angular positions X(0) and X(12) of the output shaft 22e of the motor 22d that correspond to first and second end positions of the rear derailleur 22, respectively. The first and second end positions of the rear derailleur 22 define an entire movable range of the rear derailleur 22 therebetween in the lateral direction of the bicycle 10. After the rear derailleur 22 is moved to the selected one of the derailleur positions of the rear derailleur 22, the mode button 25a of the controller 25 is operated to switch to the calibration mode for commencing the calibration process shown in FIG. 3. In the illustrated embodiment, while the controller 25 moves the rear derailleur 22 to the selected one of the derailleur positions before the calibration process is commenced, it will be apparent to those skilled in the art from this disclosure that the controller 25 can automatically move the rear derailleur 22 to a predetermined one of the derailleur positions in response to the calibration process being commenced by operating the mode button 25a of the controller 25.

In step S11, the controller 25 calculates a plurality of tuning parameters A(0) to A(11). The tuning parameters A(0) to A(11) are provided for a plurality of shift stages of the rear derailleur 22 defined between adjacent pairs of the derailleur positions of the rear derailleur 22. In other words, the adjacent pairs of the derailleur positions of the rear derailleur 22 define the shift stages of the rear derailleur 22 therebetween, respectively. In particular, in the illustrated embodiment, as shown in FIG. 4, the tuning parameters A(0) to A(11) are provided for the shift stages of the rear derailleur 22 defined between adjacent pairs of the angular positions X(0) to X(12), respectively. The tuning parameters A(0) to A(11) define minimum adjustment amounts of the rear derailleur 22 for the shift stages of the rear derailleur 22, respectively. More specifically, the controller 25 calculates the tuning parameters A(n) (n=0, ..., 11) for the shift stages of the rear derailleur 22 based on a plurality of travel values X(n+1)−X(n) (n=0, ..., 11), respectively. Each of the travel values X(n+1)−X(n) (n=0, ..., 11) is calculated as a difference between corresponding one of adjacent pairs of the angular positions X(n) and X(n+1) (n=0, ..., 11) that are stored in the memory 62. Thus, the travel values X(n+1)−X(n) are indicative of a plurality of travel distances of the movable member 51 of the rear derailleur 22 between a plurality of adjacent pairs of the derailleur positions of the rear derailleur 22, respectively. The travel distances of the movable member 51 between the adjacent pairs of the derailleur positions are measured in the lateral direction of the bicycle 10 while the rear derailleur 22 is mounted on the bicycle frame 27 of the bicycle 10. The controller 25 calculates the tuning parameters A(n) (n=0, ..., 11) for the shift stages of the rear derailleur 22, respectively, by dividing the travel values X(n+1)−X(n) (n=0, ..., 11) indicative of the travel distances of the movable member 51 between the adjacent pairs of the derailleur positions by a predetermined number, respectively. In the illustrated embodiment, the predetermined number is set to twelve. However, the predetermined number is not limited to twelve. The predetermined number can be set to fewer or more than twelve, such as ten or fifteen.

Accordingly, in the illustrated embodiment, the controller 25 calculates the tuning parameters A(n) (n=0, ..., 11) according to the following equation.

$$A(n)=(X(n+1)-X(n))/12 \ (n=0,\ldots,11)$$

After calculating the tuning parameters A(0) to A(11), the controller 25 stores or updates the tuning parameters A(0) to A(11) in the memory 62.

Next, the controller 25 adjusts or fine-tunes the selected one of the derailleur positions of the rear derailleur 22 based on adjustment inputs inputted by the electrical switches SW1 and SW2 of the first shifter 20. In other words, the bicycle derailleur adjusting apparatus 12 includes the electrical switches SW1 and SW2 of the first shifter 20 (e.g., an input member) that are configured to input the adjustment input. Specifically, the electrical switches SW1 and SW2 of the first shifter 20 (e.g., an input member) input the adjustment input that indicates the number of adjustment steps by incrementing or decrementing a counter SR of the adjustment steps in response to the operation of the electrical switches SW1 and SW2. In step S12, the controller 25 determines whether the electrical switch SW1 of the first shifter 20 has been operated in response to the operation of the shift operating member 44. If the controller 25 determines that the electrical switch SW1 of the first shifter 20 has been operated ("Yes" in step S12), then in step S13, the controller 25 operates the motor 22d to rotate the output shaft 22e of the motor 22d in an upshift rotational direction, which causes the rear derailleur 22 laterally moves in an upshift direction.

In particular, in step S13, the controller 25 rotates the output shaft 22e of the motor 22d in the upshift rotational direction by an angular value equal to one of the tuning parameters A(0) to A(11) that is associated with an upshift adjustment of the selected one of the derailleur positions of the rear derailleur 22 in the upshift direction of the rear derailleur 22. In the illustrated embodiment, the tuning parameters A(1) to A(11) are associated with the upshift adjustments of the derailleur positions of the rear derailleur 22, respectively. In other words, the tuning parameters A(1) to A(11) are associated with the upshift adjustments of the angular positions X(1) to X(11), respectively. More specifically, if the m-th derailleur position of the rear derailleur 22 that corresponds to the m-th angular position X(m) (m=1, ..., 11) has been selected, then the controller 25 operates the motor 22d to rotate the output shaft 22e of the motor 22d in the upshift rotational direction by an angular value equal to the m-th tuning parameter A(m). For example, in the illustrated embodiment, if the selected one of the derailleur positions is the fifth derailleur position corresponding to the fifth angular position X(5), then the controller 25 rotates the output shaft 22e of the motor 22d in the upshift rotational direction by an angular value equal to the fifth tuning parameter A(5). As a result, the rear derailleur 22 moves in the upshift direction of the rear derailleur 22 by the minimum adjustment amount of the rear derailleur 22 for the shift stage of the rear derailleur 22. Since the m-th tuning parameter A(m) is calculated based on the m-th travel value X(m+1)–X(m) (m=1, . . . , 11), in step S13, the controller 25 controls the motor 22d (e.g., an actuator) based on the m-th travel values X(m+1)–X(m) (m=1, . . . , 11) indicative of a travel distance of the movable member 51 between an adjacent derailleur positions to update the derailleur positions of the movable member 51.

Furthermore, in step S14, the controller 25 increments a counter SR of adjustment steps by one. Furthermore, the controller 25 stores or updates the counter SR of the adjustment steps (e.g., a number of the adjustment steps) in the memory 62 (e.g., the storage device).

On the other hand, if the controller 25 determines that the electrical switch SW1 of the first shifter 20 has not been operated ("No" in step S12), then in step S15, the controller 25 determines whether the electrical switch SW2 of the first shifter 20 has been operated in response to the operation of the shift operating member 45. If the controller 25 determines that the electrical switch SW2 of the first shifter 20 has been operated ("Yes" in step S15), then in step S16, the controller 25 operates the motor 22d to rotate the output shaft 22e of the motor 22d in a downshift rotational direction, which causes the rear derailleur 22 laterally moves in an downshift direction.

In particular, in step S16, the controller 25 rotates the output shaft 22e of the motor 22d in the downshift rotational direction by an angular value equal to one of the tuning parameters A(0) to A(11) that is associated with an downshift adjustment of the selected one of the derailleur positions of the rear derailleur 22 in the downshift direction of the rear derailleur 22. The downshift rotational direction is opposite the upshift rotational direction. In the illustrated embodiment, the tuning parameters A(1) to A(11) are associated with the downshift adjustments of the derailleur positions of the rear derailleur 22, respectively. In other words, the tuning parameters A(1) to A(11) are associated with the downshift adjustments of the angular positions X(1) to X(11), respectively. More specifically, if the m-th derailleur position of the rear derailleur 22 that corresponds to the m-th angular position X(m) (m=1, . . . , 11) is selected, then the controller 25 operates the motor 22d to rotate the output shaft 22e of the motor 22d in the downshift rotational direction by an angular value equal to the m-th tuning parameter A(m). For example, in the illustrated embodiment, if the selected one of the derailleur positions is the fifth derailleur position corresponding to the fifth angular position X(5), then the controller 25 rotates the output shaft 22e of the motor 22d in the downshift rotational direction by an angular value equal to the fifth tuning parameter A(5). As a result, the rear derailleur 22 moves in the downshift direction of the rear derailleur 22 by the minimum adjustment amount of the rear derailleur 22 for the shift stage of the rear derailleur 22. Since the m-th tuning parameter A(m) is calculated based on the m-th travel value X(m+1)–X(m) (m=1, . . . , 11), in step S16, the controller 25 controls the motor 22d (e.g., an actuator) based on the m-th travel values X(m+1)–X(m) (m=1, . . . , 11) indicative of a travel distance of the movable member 51 between an adjacent derailleur positions to update the derailleur positions of the movable member 51.

Furthermore, in step S17, the controller 25 decrements the counter SR of the adjustment steps by one. Furthermore, the controller 25 stores or updates the counter SR of the adjustment steps (e.g., a number of the adjustment steps) in the memory 62 (e.g., the storage device).

In step S18, the controller 25 determines whether the adjustment of the selected one of the derailleur positions of the rear derailleur 22 has been completed. For example, in the illustrated embodiment, the controller 25 determines that the adjustment of the selected one of the derailleur positions of the rear derailleur 22 has been completed in response to receiving an input signal from the mode button 25a of the controller 25 ("Yes" in step S18). On the other hand, if the controller 25 does not receive the input signal from the mode button 25a of the controller 25, then the calibration process returns to step S12 ("No" in step S18). Additionally and optionally, in step S18, the controller 25 further determines whether the electrical switches SW 1 and SW2 of the first shifter 20 has not been operated for a predetermined time period, such as thirty seconds. If the controller 25 determines that the electrical switches SW1 and SW2 of the first shifter 20 has not been operated for the predetermined time period, then the controller 25 also determines that the adjustment of the selected one of the derailleur positions of the rear derailleur 22 has been completed, and the calibration process proceeds to step S19.

In step S19, the controller 25 updates the derailleur positions of the movable member 51 by updating the angular positions X(1) to X(11) corresponding to the gear stages G(1) to G(11) of the rear sprockets 46. In particular, the controller 25 updates the derailleur positions of the movable member 51 based on the tuning parameters A(1) to A(11), respectively. In particular, the controller 25 updates the derailleur positions of the movable member 51 by the tuning parameters A(m) calculated based on the travel values X(m+1)–X(m) (m=1, . . . , 11) indicative of the travel distance of the movable member 51. Specifically, the controller 25 updates the derailleur positions by adjustment amounts that are calculated by multiplying the tuning parameters A(m) (n=1, . . . , 11) by the counter SR of the adjustment steps (e.g., a number of adjustment steps), respectively. More specifically, in the illustrated embodiment, the controller 25 updates the angular positions X(m) (m=1, . . . , 11) that are stored in the memory 62 by adding the adjustment amounts thereto that are calculated by multiplying the tuning parameters A(m) (n=1, . . . , 11) by the counter SR of the adjustment steps, respectively, to updates the derailleur positions of the movable member 51. In other words, the controller 25 calculates updated angular positions Xnew(m) (m=1, . . . , 11) according to the following equation.

$$X\text{new}(m) = X(m) + A(m)*SR \ (m=1, \ldots 11)$$

For example, in the illustrated embodiment, if the counter SR of the adjustment steps is five, then the updated m-th angular position Xnew(m) (m=1, . . . , 11) is calculated as X(m)+A(m)*5. In this case, since the counter SR has a positive value, the derailleur positions are adjusted towards the upshift direction, respectively. On the other hand, when the counter SR has a negative value, then the derailleur positions are adjusted towards the downshift direction, respectively. Furthermore, the controller 25 stores updated derailleur positions in the memory 62 (e.g., a storage device). Specifically, in the illustrated embodiment, the controller 25 stores the updated derailleur positions by storing the updated angular positions Xnew(m) as the angular positions X(m) in the memory 62. As a result, the controller 25 updates the angular positions X(1) to X(11) stored in the memory 62. In the illustrated embodiment, the angular positions X(O) and X(12) corresponding to the first and second end positions of the rear derailleur 22 are not updated in the memory 62. However, it will be apparent to those skilled in the art from this disclosure that the angular positions X(O) and X(12) stored in the memory 62 can also be updated in the manner similar to the calculation as described above with certain modification.

In step S20, the controller 25 resets the counter SR to zero, and complete the calibration process. In particular, the controller 25 automatically returns to the manual shifting mode or the automatic shifting mode. In these shifting modes, the controller 25 shift the rear derailleur 22 by utilizing the updated derailleur positions.

With the bicycle derailleur adjusting apparatus 12, all of the derailleur positions of the rear derailleur 22 can be calibrated. Thus, the calibration process does not need to be performed separately for each of the derailleur positions of the rear derailleur 22. Furthermore, the angular positions $X(1)$ to $X(11)$ of the output shaft 22e are differently calibrated by utilizing the tuning parameters $A(1)$ to $A(11)$ such that the calibration amounts of the derailleur positions in the lateral direction of the bicycle 10 with respect to the rear sprockets 46 are substantially equal to each other. Thus, even though the derailleur positions of the rear derailleur 22 and the angular positions $X(1)$ to $X(11)$ of the output shaft 22e have non-linear relationship with respect to each other, the derailleur positions of the rear derailleur 22 with respect to the rear sprockets 46 can be calibrated by the same amount. Specifically, the rear sprockets 46 are configured such that lateral distances between adjacent pairs of the rear sprockets 46 are equal to each other. Thus, all of the derailleur positions of the rear derailleur 22 can be properly calibrated with respect to the rear sprockets 46, respectively, by calibrating the derailleur positions of the rear derailleur 22 by the same amount.

In the illustrated embodiment, in step S19, the controller 25 updates or calibrates all of the angular positions $X(1)$ to $X(11)$ based on the tuning parameters $A(1)$ to $A(11)$ calculated in step S11 and the adjustment input inputted by the electrical switches SW1 and SW2 of the first shifter 20 (e.g., the input member) through steps S12 and 15. However, the calibration process is not limited to this. For example, in step S19, the controller 25 can only updates a part of the angular positions $X(1)$ to $X(11)$. In this case, in step S11, the controller 25 does not need to calculate all of the tuning parameters $A(1)$ to $A(11)$. In particular, the controller 25 can only calculate a part of the tuning parameters $A(1)$ to $A(11)$ that is associated with the part of the angular positions $X(1)$ to $X(11)$.

Furthermore, the controller 25 can only updates one of the angular positions $X(1)$ to $X(11)$ through the calibration process. In this case, the controller 25 can only updates one of the angular positions $X(1)$ to $X(11)$ corresponding to the selected one of the derailleur positions to which the rear derailleur 22 is moved before the calibration process is commenced. In step S1, the controller 25 can only calculate one of the tuning parameters $A(1)$ to $A(11)$ that is associated with the one of the angular positions $X(1)$ to $X(11)$ and is used for updating the one of the angular positions $X(1)$ to $X(11)$ in step S19. More specifically, when the controller 25 updates the m-th angular position $X(m)$ (m=1, ..., 11) though the calibration process, in step S11, the controller 25 calculates only the m-th tuning parameter $A(m)$ (m=1, ..., 11) by dividing the travel value $X(m+1)-X(m)$ indicative of the travel distance of the movable member 51 by a predetermined number, such as twelve. Then, in step S19, the controller 25 updates the m-th derailleur position stored in the memory (e.g., the storage device) as the m-th angular position $X(m)$ based on the m-th tuning parameter $A(m)$ and the adjustment input inputted by the electrical switches SW1 and SW2 of the first shifter 20 (e.g., the input member). In particular, in step S19, the controller 25 calculates an updated m-th derailleur position of the derailleur positions as an updated m-th angular position Xnew(m) by multiplying the m-th tuning parameter $A(m)$ by the counter SR of the adjustment steps (e.g., a number of adjustment steps) inputted through steps S12 and S15. Then, the controller 25 stores the updated m-th derailleur position of the derailleur positions in the memory 62 (e.g., a storage device) by storing the updated m-th angular position Xnew(m) as the m-th angular position $X(m)$.

In the illustrated embodiment, the tuning parameters $A(1)$ to $A(11)$ are associated with the upshift adjustments of the angular positions $X(1)$ to $X(11)$, respectively, while the tuning parameters $A(1)$ to $A(11)$ are associated with the downshift adjustments of the angular positions $X(1)$ to $X(11)$, respectively. In other words, while the m-th derailleur position of the rear derailleur 22 that corresponds to the m-th angular position $X(m)$ (m=1, ..., 11) is adjusted in steps S13 and 16, the same tuning parameter $A(m)$ (m=1, ..., 11) is used for both the upshift adjustment and the downshift adjustment. However, the tuning parameters used for the upshift adjustment and the down shift adjustment can be different from each other. For example, while the m-th derailleur position of the rear derailleur 22 that corresponds to the m-th angular position $X(m)$ (m=1, ..., 11) is adjusted in steps S13 and 16, the m-th tuning parameter $A(m)$ (m=1, ..., 11) can be used for the upshift adjustment in step S13, and the (m-1)-th tuning parameter $A(m-1)$ (m=1, ..., 11) can be used for the downshift adjustment in step S16. In this case, the controller 25 separately stores an upshift counter SR1 of the adjustment steps in the upshift direction, and a downshift counter SR2 of the adjustment steps in the downshift direction. Specifically, the controller 25 increments the upshift counter SR1 of the adjustment steps by one in step S14, while the controller 25 increments the downshift counter SR2 of the adjustment steps by one in step S17. Furthermore, in step S19, the controller 25 updates the derailleur positions based on the tuning parameters $A(0)$ to $A(11)$ and the upshift and downshift counters SR1 and SR2. More specifically, in step S19, the controller 25 calculates updated angular positions Xnew(m) (m=1, ..., 11) according to the following equation.

$$X\text{new}(nm)=X(m)+A(m)*SR1-A(m-1)*SR2 \ (m=1, \ldots 11)$$

In the illustrated embodiment, the derailleur positions can correspond to shifting positions or trim positions. The shifting positions are suitable positions for engaging or shifting the chain 26 to object gears (e.g., the rear sprockets 46 or the front chainwheels), respectively. The trim positions are suitable positions for driving the chain 26 while maintaining an interval between the chain 26 and a part of a derailleur (e.g., the rear derailleur 22 or the front derailleur 23) after engaging or shifting the chain 26 to the object gears, respectively. The shifting positions and the trim positions can be the same positions, respectively. However, the shifting positions and the trim positions can be different positions, respectively. In this case, the relative positions (distances) between the shifting positions and the trim positions can be predetermined, respectively. Thus, when one of the plurality of the shifting positions and the plurality of the trim positions is changed, the other of the plurality of the shifting positions and the plurality of the trim positions can also be changed. Especially, in the front derailleur 23, there can be a plurality of trim positions for one gear stage (or one of the object gears) to prevent the chain 26 from contacting to a chain plate of the front derailleur 23. In this case, the relative positions (distances) between the plurality of the trim positions for one gear stage can be predetermined. Thus, when the shifting positions are changed, then the corresponding trim positions and the trim positions for one gear stage can also be changed. Similarly, when one of the trim positions for one gear stage is changed, then the shifting positions can also be changed.

In understanding the scope of the present invention, the term "coupled" or "coupling", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "attached", "mounted", "bonded", "fixed" and their derivatives.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only a preferred embodiment has been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially their intended function. Components that are shown directly connected or contacting each other can have intermediate structures disposed between them unless specifically stated otherwise. The functions of one element can be performed by two, and vice versa unless specifically stated otherwise. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiment according to the present invention are provided for illustration only, and not for the purpose of limiting the invention as defined by the appended claims and their equivalents.

What is claimed is:

1. A bicycle derailleur adjusting apparatus for adjusting a bicycle derailleur including a base member adapted to be mounted to a bicycle, a movable member, a linkage coupled between the base member and the movable member, and an actuator configured to move the movable member of the bicycle derailleur among a plurality of derailleur positions, the bicycle derailleur adjusting apparatus comprising:

a controller configured to obtain angular derailleur positions corresponding to an adjacent pair of the derailleur positions, which includes a current derailleur position of the movable member, the controller being further configured to calculate a travel value which is indicative of a travel distance of the movable member between the adjacent pair of the derailleur positions, based on a difference between the angular derailleur positions corresponding to the adjacent pair of the derailleur positions;

the controller being further configured to control the actuator based on the travel value that was calculated, and to update the derailleur positions of the movable member based on the travel value that was calculated.

2. The bicycle derailleur adjusting apparatus according to claim 1, wherein
the controller is configured to update the derailleur positions of the movable member by a tuning parameter calculated based on the travel value indicative of the travel distance of the movable member.

3. The bicycle derailleur adjusting apparatus according to claim 2, wherein
the controller is configured to calculate the tuning parameter.

4. The bicycle derailleur adjusting apparatus according to claim 2, further comprising
a storage device configured to store the derailleur positions of the movable member, the derailleur positions corresponding to a plurality of sprockets, respectively.

5. The bicycle derailleur adjusting apparatus according to claim 4, further comprising
an input member configured to input an adjustment input, the controller being configured to update one of the derailleur positions stored in the storage device based on the tuning parameter and the adjustment input inputted by the input member.

6. The bicycle derailleur adjusting apparatus according to claim 1, wherein
the actuator has an output member that is rotatable and operatively coupled to the linkage, and
the controller is configured to determine a rotational value of the output member.

7. The bicycle derailleur adjusting apparatus according to claim 1, wherein
the travel distance of the movable member between the adjacent derailleur positions is measured in a lateral direction of the bicycle while the bicycle derailleur is mounted on a bicycle frame of the bicycle.

8. The bicycle derailleur adjusting apparatus according to claim 1, wherein
the controller is further configured to calculate a plurality of tuning parameters for a plurality of shift stages of the bicycle derailleur based on a plurality of travel values indicative of a plurality of travel distances of the movable member between a plurality of adjacent pairs of the derailleur positions, respectively, and
the controller being further configured to update the derailleur positions of the movable member based on the tuning parameters, respectively.

9. The bicycle derailleur adjusting apparatus according to claim 8, wherein
the adjacent pairs of the derailleur positions define the shift stages of the bicycle derailleur therebetween, respectively.

10. The bicycle derailleur adjusting apparatus according to claim 8, wherein the controller is further configured to calculate the tuning parameters for the shift stages of the bicycle derailleur by dividing the travel values indicative of the travel distances of the movable member between the adjacent pairs of the derailleur positions by a predetermined number, respectively.

11. The bicycle derailleur adjusting apparatus according to claim 8, wherein
the controller is further configured to update the derailleur positions by adjustment amounts that are calculated by multiplying the tuning parameters by a number of adjustment steps, respectively.

12. The bicycle derailleur adjusting apparatus according to claim 11, wherein
the controller is further configured to store updated derailleur positions in a storage device.

13. The bicycle derailleur adjusting apparatus according to claim 12, wherein
the controller is further configured to store the number of the adjustment steps in the storage device.

14. A bicycle derailleur adjusting apparatus for adjusting a bicycle derailleur including a base member adapted to be mounted to a bicycle, a movable member, a linkage coupled between the base member and the movable member, and an actuator configured to move the movable member of the bicycle derailleur among a plurality of derailleur positions, the bicycle derailleur adjusting apparatus comprising:
a controller configured to control the actuator based on a travel value indicative of a travel distance of the movable member between adjacent derailleur positions to update the derailleur positions of the movable member,
the controller being configured to update the derailleur positions of the movable member by a tuning parameter that is calculated based on the travel value indicative of the travel distance of the movable member,
the controller being further configured to calculate the tuning parameter by dividing the travel value indicative of the travel distance of the movable member by a predetermined number.

15. A bicycle derailleur adjusting apparatus for adjusting a bicycle derailleur including a base member adapted to be mounted to a bicycle, a movable member, a linkage coupled between the base member and the movable member, and an actuator configured to move the movable member of the bicycle derailleur among a plurality of derailleur positions, the bicycle derailleur adjusting apparatus comprising:
a controller configured to control the actuator based on a travel value indicative of a travel distance of the movable member between adjacent derailleur positions to update the derailleur positions of the movable member,
the controller being configured to update the derailleur positions of the movable member by a tuning parameter that is calculated based on the travel value indicative of the travel distance of the movable member,
the controller being further configured to calculate an updated one of the derailleur positions by multiplying the tuning parameter by a number of adjustment steps.

16. The bicycle derailleur adjusting apparatus according to claim 15, further comprising
an input member configured to input an adjustment input that indicates the number of adjustment steps.

17. The bicycle derailleur adjusting apparatus according to claim 15, wherein
the controller is further configured to store the updated one of the derailleur positions in a storage device.

18. The bicycle derailleur adjusting apparatus according to claim 17, wherein
the controller is further configured to store the number of the adjustment steps in the storage device.

* * * * *